US011041999B2

(12) United States Patent
Winzer et al.

(10) Patent No.: US 11,041,999 B2
(45) Date of Patent: Jun. 22, 2021

(54) CHIP-TO-CHIP OPTICAL INTERCONNECT

(71) Applicant: Nokia Solutions and Networks OY, Espoo (FI)

(72) Inventors: Peter Winzer, Aberdeen, NJ (US); David Neilson, Old Bridge, NJ (US); Po Dong, Morganville, NJ (US)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 16/688,144

(22) Filed: Nov. 19, 2019

(65) Prior Publication Data

US 2020/0158964 A1 May 21, 2020

Related U.S. Application Data

(60) Provisional application No. 62/770,331, filed on Nov. 21, 2018.

(51) Int. Cl.
*G02B 6/42* (2006.01)
*G02B 6/02* (2006.01)
*G02B 6/34* (2006.01)

(52) U.S. Cl.
CPC ....... *G02B 6/4202* (2013.01); *G02B 6/02042* (2013.01); *G02B 6/34* (2013.01);
(Continued)

(58) Field of Classification Search
CPC ........ G02B 6/02; G02B 6/02042; G02B 6/30; G02B 6/34; G02B 6/42; G02B 6/4202;
(Continued)

(56) References Cited

U.S. PATENT DOCUMENTS 6,477,286 B1    11/2002 Ouchi
6,592,269 B1    7/2003 Brophy et al.
(Continued)

OTHER PUBLICATIONS

Velha, P., et al. "Wide-band polarization controller for Si photonic integrated circuits." Optics Letters 41.24 (2016): 5656-5659.
(Continued)

*Primary Examiner* — Michael P Mooney
(74) *Attorney, Agent, or Firm* — Mendelsohn Dunleavy, P.C.; Yuri Gruzdkov (57) ABSTRACT

An optical interconnect circuit for transmitting data between two or more electronic chips. In an example embodiment, the optical interconnect circuit comprises two or more photonic chips, each of which is vertically stacked with the corresponding electronic chip such that compact optical modulators and/or photodetectors of the photonic chip are in close proximity to the data sources/sinks of the corresponding electronic chip. Multi-core optical fibers and vertical coupling structures are used to provide multiple optical connections between different photonic chips. Advantageously, the provided capability to place optical modulators close to the data sources and to place photodetectors close to the data sinks can be used to reduce the amount of required electrical wiring. Optical-waveguide connections to the multi-core fibers can be used to allow for high density of optical conduits without spatially constraining the placement of data sources and/or data sinks on the electronic chips.

14 Claims, 7 Drawing Sheets

(52) U.S. Cl.
CPC ......... *G02B 6/4214* (2013.01); *G02B 6/4216* (2013.01); *G02B 6/4249* (2013.01); *G02B 6/4274* (2013.01)

(58) Field of Classification Search
CPC ...... G02B 6/4216; G02B 6/4249; G02B 6/12; G02B 6/1225; G02B 6/125; G02B 6/2813; G02B 6/4214; G02B 6/423; G02B 6/4246; G02B 6/4257; G02B 6/4274; G02F 1/025; G02F 1/01; G02F 1/0121; G02F 1/0155; G02F 1/0157
USPC .......................................... 385/14, 49–52, 37
See application file for complete search history.

(56) References Cited

U.S. PATENT DOCUMENTS

| | | | |
|---|---|---|---|
| 7,344,383 | B1 | 3/2008 | Lu et al. |
| 8,494,315 | B2 | 7/2013 | Dupuis et al. |
| 8,604,577 | B2 | 12/2013 | Koch |
| 8,625,942 | B2 | 1/2014 | Na et al. |
| 9,028,157 | B2 | 5/2015 | Na et al. |
| 9,244,227 | B2 | 1/2016 | Xu et al. |
| 10,151,865 | B2 | 12/2018 | Miao et al. |
| 10,365,435 | B1 | 7/2019 | Karimelahi et al. |
| 2003/0235370 | A1 | 12/2003 | Taillaert et al. |
| 2006/0291784 | A1 | 12/2006 | Wang et al. |
| 2010/0027947 | A1 | 2/2010 | Dutta |
| 2016/0116688 | A1* | 4/2016 | Hochberg ............ G02B 6/1225 385/14 |
| 2017/0351024 | A1* | 12/2017 | Hayakawa ............... G02B 6/12 |

OTHER PUBLICATIONS

Essiambre, René-Jean, et al. "Capacity limits of optical fiber networks." Journal of Lightwave Technology 28.4 (2010): 662-701.

Winzer, Peter J. et al., "Sensitivity Enhancement of Optical Receivers by Impulsive Coding." Journal of Lightwave Technology 17.2 (1999): 171-177.

Dar, Ronen, et al. "Cost-optimized submarine cables using massive spatial parallelism." Journal of Lightwave Technology 36.18 (2018): 3855-3865.

Winzer, Peter J. "Would Scaling to Extreme Ultraviolet or Soft X-Ray Communications Resolve the Capacity Crunch?." Journal of Lightwave Technology 36.24 (2018): 5786-5793.

Saitoh, Kunimasa, and Shoichiro Matsuo. "Multicore fiber technology." Journal of Lightwave Technology 34.1 (2016): 55-66.

Kim, J., et al. "1100×1100 port MEMS-based optical crossconnect with 4-dB maximum loss." IEEE Photonics Technology Letters 15.11 (2003): 1537-1539.

Luís, R. S., et al. "On the spectral efficiency limits of crosstalk-limited homogeneous single-mode multi-core fiber systems." Optics InfoBase Conference Papers, vol. Part F53-Networks; (2017); 4 pgs.

Schaevitz, Rebecca K., et al. "Simple electroabsorption calculator for designing 1310 nm and 1550 nm modulators using germanium quantum wells." IEEE Journal of Quantum Electronics 48.2 (2011): 187-197.

Doerr, C. R., et al. "Packaged Monolithic Silicon 112-Gb/s Coherent Receiver." IEEE Photonics Technology Letters 23.12 (2011): 762-764.

Winzer, Peter J. "Making spatial multiplexing a reality." Nature Photonics 8.5 (2014): 345. (4 pages).

Caplan, David O. "Laser communication transmitter and receiver design." Free-Space Laser Communications. Springer, New York, NY, 2007. 109-246.

Sinkin, Oleg V., et al. "SDM for Power-Efficient Undersea Transmission." Journal of Lightwave Technology 36.2 (2017): 361-371.

Kalmar, Andras, et al. "Multifunctional Optical Terminals for Microsatellite Clusters—Design Tradeoffs." AEU—International Journal of Electronics and Communications 56.4 (2002): 279-288.

Woodward, T. K., et al. "Clocked-sense-amplifier-based smart-pixel optical receivers." IEEE Photonics Technology Letters 8.8 (1996): 1067-1069.

Dines, J. A. B. "Smart pixel optoelectronic receiver based on a charge sensitive amplifier design." IEEE Journal of Selected Topics in Quantum Electronics 2.1 (1996): 117-120.

Woodward, T. K., et al. "Demultiplexing 2.48-Gb/s optical signals with a CMOS receiver array based on clocked-sense-amplifiers." IEEE Photonics Technology Letters 9.8 (1997): 1146-1148.

Hwang et al.; "Passively Assembled Optical Interconnection System Based on an Optical Printed-Circuit Board"; IEEE Photonics Technology Letters, 18.5 (2006); 652-654.

Winzer, Peter, U.S. Appl. No. 16/688,436 titled "Optical Fiber Connector Coupling and Package for Optically Interconnected Chips"; filed Nov. 19, 2019 (20 pages).

* cited by examiner

CHIP-TO-CHIP OPTICAL INTERCONNECT

CROSS-REFERENCE TO RELATED APPLICATIONS

This application claims the benefit of U.S. Provisional Patent Application No. 62/770,331, filed 21 Nov. 2018, and entitled "CHIP-TO-CHIP OPTICAL INTERCONNECT," which is incorporated herein by reference in its entirety.

BACKGROUND

Field

Various example embodiments relate to optical communication circuits and devices and, more specifically but not exclusively, to optical transmitters, optical receivers, and optical interconnects.

Description of the Related Art

This section introduces aspects that may help facilitate a better understanding of the disclosure. Accordingly, the statements of this section are to be read in this light and are not to be understood as admissions about what is in the prior art or what is not in the prior art.

The demand for higher data rates and lower latency drives the application of new technologies in circuit and system design. For example, optical communication technologies can be used to support the current and future data-rate and latency needs. The corresponding circuits may employ both electrical and/or optical components configured to exchange relatively large volumes of data at a relatively high rate.

SUMMARY OF SOME SPECIFIC EMBODIMENTS

Disclosed herein are various embodiments of an optical interconnect circuit for transmitting data between two or more electronic chips. In an example embodiment, the optical interconnect circuit comprises two or more photonic chips, each of which is vertically stacked with the corresponding electronic chip such that compact optical modulators and/or photodetectors of the photonic chip are in close proximity to the data sources/sinks of the corresponding electronic chip. Multi-core optical fibers and vertical optical coupling structures are used to provide multiple optical connections between different photonic chips. In some embodiments, one or more separate light sources can be used to provide optical carriers and/or optical local oscillators to at least some of the photonic chips.

Advantageously, the provided capability to place optical modulators close to the data sources and to place photodetectors close to the data sinks can be used to reduce the amount of required electrical wiring. Optical-waveguide connections to the multi-core fibers can be used to allow for high density of optical conduits without overly spatially constraining the placement of data sources and/or data sinks on the electronic chips.

According to an example embodiment, provided is an apparatus comprising: a photonic chip having first and second opposing major surfaces and comprising a plurality of electro-optic elements; and an electronic chip having a major surface that has a plurality of electrical contacts thereon; wherein said major surface of the electronic chip is bonded to the first major surface of the photonic chip such that the plurality of electrical contacts of the electronic chip is in alignment with the plurality of electro-optic elements of the photonic chip; wherein the photonic chip further comprises a plurality of first vertical optical coupling structures at the second major surface thereof, each of said first vertical optical coupling structures being connected by way of a respective first planar optical waveguide to a respective electro-optic element of the plurality of electro-optic elements; and wherein the first vertical optical coupling structures are arranged to receive light from or output light out of the second major surface.

In some embodiments, the first vertical optical coupling structures are arranged to receive the light from or output the light to different respective cores of a multi-core optical fiber in a direction that is substantially orthogonal to the second major surface.

According to another example embodiment, provided is an apparatus comprising: a photonic chip having first and second opposing major surfaces and comprising a plurality of electro-optic elements; and an electronic chip having a major surface that has a plurality of electrical contacts thereon; wherein said major surface of the electronic chip faces the first major surface of the photonic chip such that the electronic chip and the electro-optic elements are electrically connected; wherein the photonic chip further comprises a plurality of first vertical optical coupling structures at the second major surface thereof, each of said first vertical optical coupling structures being connected by way of at least a first optical planar waveguide to a respective electro-optic element of the plurality of electro-optic elements; and wherein the first vertical optical coupling structures are capable of, at least one of receiving light externally incident on the second major surface and outputting light from the second major surface.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Some embodiments disclosed herein may benefit from the use of some features disclosed in the U.S. Patent Application by Peter Winzer, David Neilson, Shahriar Shahramian, Ser. No. 16/688,436, filed on the same date as the present application, and entitled "OPTICAL FIBER CONNECTOR COUPLING AND PACKAGE FOR OPTICALLY INTERCONNECTED CHIPS," which is incorporated herein by reference in its entirety.

As used herein, the terms "photonic integrated circuit" (or PIC, photonic chip) should be construed to cover planar lightwave circuits (PLCs), integrated optoelectronic devices, wafer-scale products on substrates, individual photonic chips and dies, and hybrid devices. Example materials systems that can be used for manufacturing various PICs may include but are not limited to III-V semiconductor materials, silicon photonics, silica-on-silicon products, silica-glass-based PLCs, polymer integration platforms, Lithium Niobate and derivatives, nonlinear optical materials, etc. Both packaged devices (e.g., wired-up and/or encapsulated chips) and unpackaged devices (e.g., dies) can be referred to as PICs.

PICs can be adapted for various applications, e.g., in telecommunications, instrumentation, and signal-processing fields. A PIC typically uses optical waveguides to implement and/or interconnect various circuit components, such as optical switches, couplers, routers, splitters, multiplexers/demultiplexers, filters, modulators, phase shifters, lasers, optical amplifiers, wavelength converters, optical-to-electrical (O/E) and electrical-to-optical (E/O) signal converters, photodetectors, etc. An optical waveguide in a PIC is usually an on-chip solid light conductor that guides light due to an index-of-refraction contrast, e.g., between the waveguide's core and cladding.

As used herein, the term "hybrid integrated circuit" (or device) refers to a multi-component circuit constructed of multiple monolithic integrated circuits (e.g., photonic chips and conventional electronic integrated circuits (ICs)) and possibly some discrete (e.g., lumped) circuit components, attached together, e.g., to be physically mountable on and electrically connectable to a common base, substrate, or carrier. A representative hybrid circuit may include (i) one or more packaged or non-packaged dies, with some or all of the dies including optical, optoelectronic, and/or semiconductor devices, and (ii) one or more optional discrete components, such as connectors, resistors, capacitors, and inductors. Electrical connections between the ICs, photonic chips, dies, and discrete components can be formed, e.g., using patterned conducting (such as metal) layers, ball-grid arrays, solder bumps, wire bonds, etc. Optical connections between the photonic chips, dies, and discrete components can be formed, e.g., using optical couplers, fibers, and/or waveguides.

As used herein, the term "integrated circuit" (or IC) should be construed to encompass both a non-packaged die and a packaged die.

As used herein the term "substrate" refers to a type of circuit carrier or base designed and configured to provide physical support and optionally to provide electrical and/or optical connections between different parts thereof to enable proper operation of electrical, optical, and/or optoelectronic circuits and/or devices located at or connected to those parts. Such circuits/devices may include any combination of packaged or non-packaged electronic integrated circuits, photonic integrated circuits, and discrete circuit components. Electrical connections between different parts of the substrate can be formed, e.g., using patterned conducting (such as metal) layers, e.g., located within the body and/or on the surface of the substrate. Optical connections between different parts of the substrate can be formed, e.g., using optical waveguides fabricated thereon as known in the pertinent art. In some embodiments, the substrate may have several distinct levels, e.g., comprising a redistribution layer (RDL), an interposer, a laminated plate, and/or a printed circuit board.

In some embodiments, a substrate can be substantially planar in the sense that its lateral dimensions (e.g., length and width) can be significantly larger than its thickness and/or the feature size on a "major" surface thereof. A major surface of the substrate is a surface thereof that has relatively large sizes, e.g., the largest length and width, among all exterior surfaces of the substrate. The exterior surfaces of the substrate that have one relatively large size, e.g., length, and one relatively small size, e.g., height, are typically referred to as the edges of the substrate.

A major surface and an edge of a die or chip can be identified in a similar manner.

As used herein the term "optoelectronic" refers to an attribute of a circuit or device that enables the latter to operate based on both light and electrical currents and/or voltages. For example, an optoelectronic circuit may include one or more of: (i) an electrically driven light source, such as a laser diode; (ii) an optical amplifier; (iii) an optical-to-electrical converter, such as a photodiode; and (iv) an optoelectronic component that can control the propagation and/or certain properties of light, such as an optical modulator or an optical switch. The optoelectronic circuit may additionally include one or more optical elements and/or one or more electronic components that enable the use of the circuit's optoelectronic components in a manner consistent with the intended function or application.

As used herein the expression "grating vertical optical coupler" or "grating vertical optical coupling structure" refers to an optical coupler having one or more optical gratings for end-coupling one or more optical cores of an optical fiber to end(s) of one or more optical planar waveguides in response to a corresponding end of the optical fiber being positioned to face the optical coupler, in an appropriate relative distance range therefrom, and with an appropriate alignment, e.g., a rotational and/or positional alignment with respect to the optical coupler.

The following gives a brief description of some technological processes that can be used to fabricate and process at least some chips used in various embodiments.

In a typical fabrication process, dies are produced in relatively large batches using suitable wafers. Electrical and/or optical circuits can be gradually created on a wafer using a multi-step sequence, e.g., of photolithographic, deposition, etching, doping, and/or chemical processing steps. Each wafer is then cut ("diced") into many pieces (chips, dies), each containing a respective copy of the circuit that is being fabricated. Each individual die can be appropriately packaged for further use or be left unpackaged (e.g., be in a state sometimes referred to as the "bare die").

Dies intended for wire-bond packages are typically outfitted with small metal pads, typically located near the die edges. The individual dies are cut out of the wafer, and each die can be attached to its carrier, such as an interconnecting substrate, a redistribution layer, an interposer, a laminate plate, a wire board, or the like. Electrical wires can then be bonded to the metal pads on the face of the die to electrically connect the die to the carrier. These wires and the patterned conducting layers located in the body and/or on the surface of the carrier provide electrical connections between the die and the corresponding pins or terminals, e.g., located on the outside of the package. These pins/terminals can then be used to electrically connect the corresponding package to other circuits of the corresponding device and/or to external electrical circuitry.

Processing a die intended for a flip-chip assembly is similar but has several additional and/or modified processing steps. For example, the small metal pads on the face of the die can be arranged in a two-dimensional area array instead of being in one or more linear edge arrays. This design feature can be realized, e.g., by adding dielectric and metal layers configured to appropriately route electrical connections from the functional layer(s) of the die to the metal pads. A small dot (e.g., a bump or a ball) of solder can then be deposited on each metal pad. The wafer is then diced as customary. The resulting individual dies may be fluxed and placed on the respective interconnecting substrates or mating dies face down (e.g., in a flipped orientation compared to that in a wire-bond package). The solder is then reflowed by being heated to above its melting temperature to form permanent electrical connections between the die and the substrate or mating die.

In some embodiments, individual chips can be stacked. As used herein, the term "stack" refers to an orderly (e.g., vertical) arrangement of packaged and/or unpackaged dies in which the major planes of the stacked dies are substantially parallel to each other. A stack can typically be mounted on a corresponding device carrier in an orientation in which the major plains of the stacked dies are substantially parallel to each other and/or to the major plane of the carrier and are located at different respective offset distances from the major plane of the device carrier.

Figure 1:
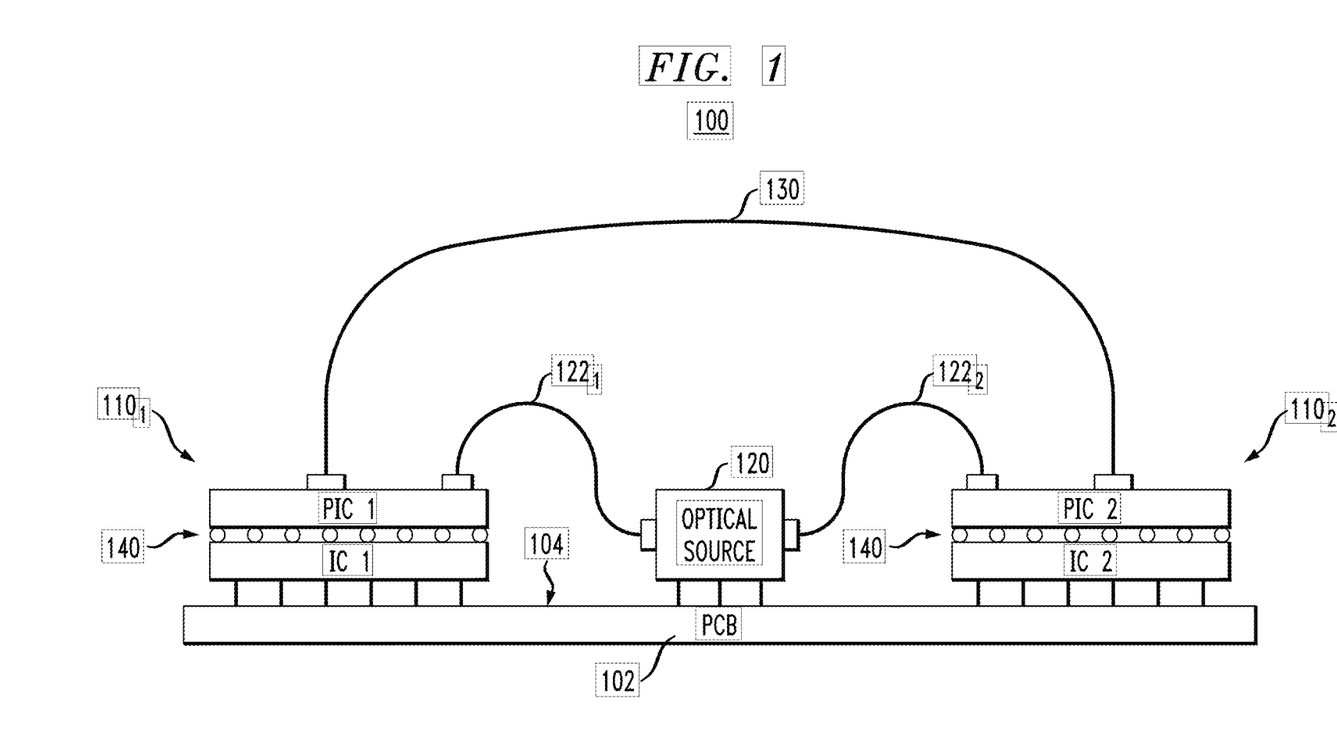
FIG. 1 shows a schematic side view of an optoelectronic system according to an embodiment.

FIG. 1 shows a schematic side view of an optoelectronic system 100 according to an embodiment. System 100 comprises chip stacks $110_1$ and $110_2$ and an optical source (e.g., one or more lasers) 120 supported on a printed circuit board (PCB), substrate, or device carrier 102.

Each of chip stacks $110_1$ and $110_2$ comprises a respective PIC and a respective electronic IC. For example, chip stack $110_1$ comprises a photonic integrated circuit PIC1 and an electronic integrated circuit IC1 vertically stacked on a major surface 104 of board 102 as indicated in FIG. 1. Chip stack $110_2$ comprises a photonic integrated circuit PIC2 and an electronic integrated circuit IC2 similarly stacked on surface 104. As used herein, the term "vertical" refers to a direction that is orthogonal to surface 104.

Optical source 120 is connected to provide light to circuits PIC1 and PIC2 via optical fibers $122_1$ and $122_2$, respectively. The provided light can be used in circuits PIC1 and PIC2, e.g., as an optical carrier for generating outgoing data-modulated optical signals and/or as an optical local oscillator for coherent detection of received data-modulated optical signals, e.g., as described in more detail below. The generated data-modulated optical signals can be transmitted between different parts of system 100, e.g., using one or more optical fibers 130, only one of which is explicitly shown in FIG. 1 for illustration purposes (see, e.g., FIG. 2). The various optical fibers (e.g., 122, 130) used in system 100 can be single-core optical fibers and/or multi-core optical fibers. In various embodiments, single-mode and/or multi-mode optical fibers may be used.

In various embodiments, optical source 120 can be a continuous-wave (CW) optical source or a pulsed optical source.

In operation, optical source 120, circuits PIC1, PIC2, and optical fibers 122, 130 provide an optical interconnect circuit that can be used, e.g., for transmitting data between circuits IC1 and IC2.

In an example embodiment, such an optical interconnect circuit enables data signals generated on a silicon-electronics chip (e.g., IC1) to be coupled to compact optical modulators of a PIC (e.g., PIC1) and then into a corresponding optical fiber (e.g., 130) for transmission to another electronic circuit (e.g., IC2). Thereat, the data signals are first received using an optical receiver of the corresponding PIC (e.g., PIC2) and then applied by the PIC to said another electronic circuit.

In some embodiments, system 100 can use on-chip optical-power splitting and routing to enable: (i) flexible placement of optical modulators and/or photodetectors in circuits PIC1, PIC2, and (ii) dense optical connections at major surfaces of circuits PIC1, PIC2, e.g., implemented using one or more multi-core forms of the optical fibers 130.

In an example embodiment, the optical modulators used in circuits PIC1 and/or PIC2 can be, e.g., electro-absorption modulators (EAMs). Using the above-mentioned flexible placement, circuits PIC1 and/or PIC2 can be designed to place the EAMs in close proximity to the data source(s) and/or to place the photodetectors in close proximity to the data sink(s), e.g., data demodulators, on the corresponding electronic ICs, e.g., circuits IC1 and IC2 in stacks $110_1$ and $110_2$. The optical waveguides of circuits PIC1 and/or PIC2 can then be used to provide optical routing between the fiber core(s), e.g., individually, of the one or more optical fibers 130 and the EAMs and photodetectors. Advantageously, the ability to place relatively small and simple-to-drive devices, such as the EAMs, close to the data source(s) on the electronic chip and to place photodetectors close to the data sink(s) on the electronic chip can be used to reduce the amount of on-chip and/or in-stack electrical wiring. In addition, the optical-waveguide connections to the multi-core fibers can beneficially be used to allow for high density of the off-chip optical conduits (e.g., fiber cores) without overly spatially constraining the placement of data sources and/or data sinks on the electronic chips.

In some embodiments, the integrated circuits of a stack 110 may be fabricated on respective separate substrates and bonded to one another by wafer bonding or bump bonding. As an example, FIG. 1 shows the circuits PIC1 and IC1 of the stack $110_1$ as having been bonded and electrically connected using bumps (e.g., solder bumps or balls) 140. The circuits PIC2 and IC2 of the stack $110_2$ can be similarly bonded and electrically connected to one another.

In various embodiments, the optical modulators of circuits PIC1, PIC2 can be fabricated using a variety of possible material systems, including but not limited to III-V materials (such as InGaAsP, InAlAsP, GaAlAs) and group IV materials (such as Ge or SiGe). In some embodiments, the optical modulators may operate using bulk electro-absorption or quantum-confined absorption effects. The waveguide couplers, splitters, and waveguides may not be fabricated in the same material system as the modulators. For example, silicon waveguides or SiN-based waveguides may be used.

In some embodiments, system 100 may have one or more of the following features:
(i) two or more optical sources 120;
(ii) three or more chip stacks 110;
(iii) two or more PCBs 102, e.g., so that some chip stacks are on different PCBs;
(iv) the distance between some of the stacks 110 in the range between 1 cm and 10 km;
(v) three or more of the PICs fed by a same (common) optical source 120;
(vi) some of the PICs fed by more than one optical source 120;
(vii) polarization maintaining fibers 122 and/or 130;
(viii) non-polarization maintaining fibers 122 and/or 130;

(ix) direct-detection receivers in some or all of the PICs; and (x) coherent receivers in some or all of the PICs.

In various embodiments, optical fibers 122 and/or 130 can be selected from an assortment of single-mode, multimode, single-core, and multi-core optical fibers. In some embodiments, one or more of the cores of a multi-core fiber may each be larger than the single-mode limit for the intended carrier wavelength, e.g., in the O, E, S, C, L and/or U optical fiber communication bands, e.g., to ease alignment tolerances. In this case, each core may support a small number (>1) of lateral spatial propagation modes, e.g., three or more such modes. In some embodiments, optical fibers with quadratic refractive-index profiles may be used. Such optical fibers can typically support many propagation modes, but can be sufficiently short and well controlled, e.g., such that the optical fiber of this type in effect performs imaging of one end thereof onto the other end thereof (e.g., similar to an optical imaging endoscope).

Figure 2:
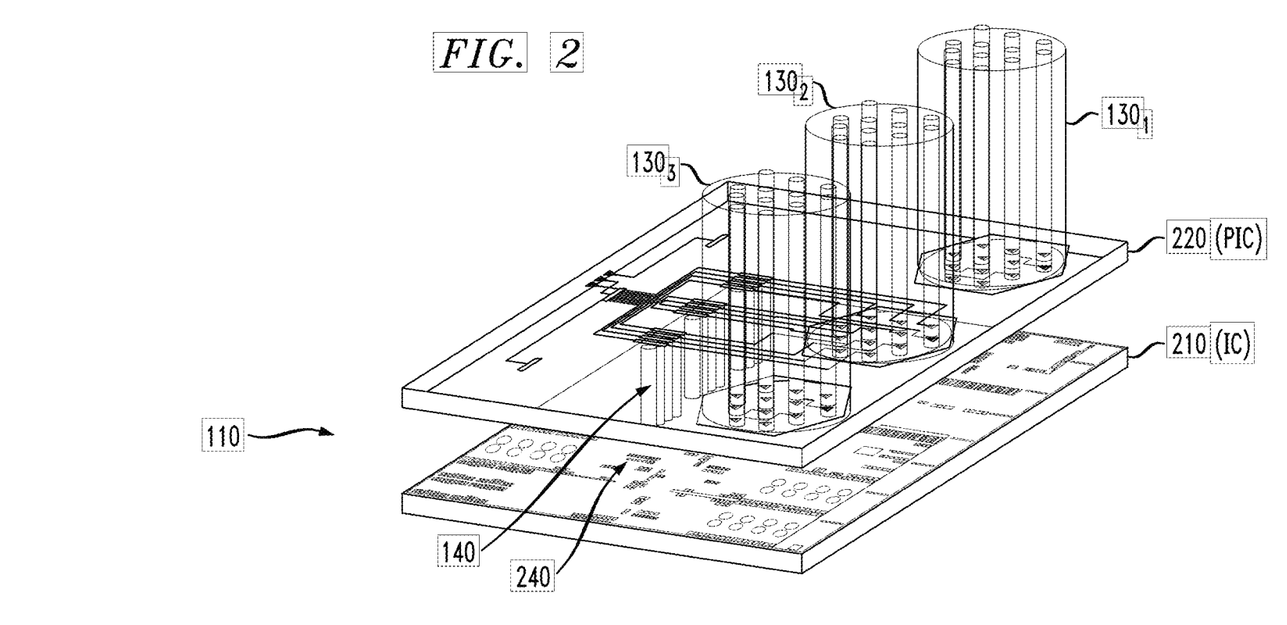
FIG. 2 shows a schematic three-dimensional perspective view of a chip stack that can be used in the optoelectronic system of FIG. 1 according to an embodiment.

FIG. 2 shows a schematic three-dimensional perspective view of a chip stack 110 that can be used in system 100 according to an embodiment. In this embodiment, chip stack 110 comprises an optical transceiver PIC 220 and an electronic IC 210. Also explicitly shown are multi-core optical fibers $130_1$-$130_3$ optically coupled to transmit a plurality of optical data signals generated by PIC 220 in response to the electrical data signals generated by electronic IC 210. For example, separate optical cores of a same multi-core optical fiber may transmit independent or different optical data signals, e.g., having a different or independent digital data stream modulated thereon, and the different optical cores of the same multi-core optical fiber may or may not have significant optical crosstalk therebetween.

In the shown embodiment, PIC 220 comprises a plurality of input grating vertical optical couplers (see elements 310, FIG. 3), a plurality of output grating vertical optical couplers (see elements 390, FIG. 3), and a plurality of optical modulators (e.g., EAM's; see elements 340, FIG. 3) optically connected using a suitable waveguide-interconnect structure. These example elements of PIC 220 are described in more detail below in reference to FIG. 3.

Electronic IC 210 may comprise one or more data sources and a plurality of modulator drivers 240 configured to electrically drive the optical modulators of PIC 220 in response to the data received from the one or more data sources. The corresponding electrical connections between the optical modulators of PIC 220 and modulator drivers 240 of IC 210 can be implemented using some of the bumps or balls 140 (shown in FIG. 2 with an exaggerated vertical size; also see FIG. 1). Modulator drivers 240 are also connected, e.g., via on-chip buses, to the one or more data sources (e.g., digital circuits such as digital data registers and/or other devices), which IC 210 may have or be connected to. In operation, modulator drivers 240 generate electrical drive signals for the optical modulators of PIC 220 to modulate optical signals or optical carriers to carry the data received from the data sources.

Figure 3:
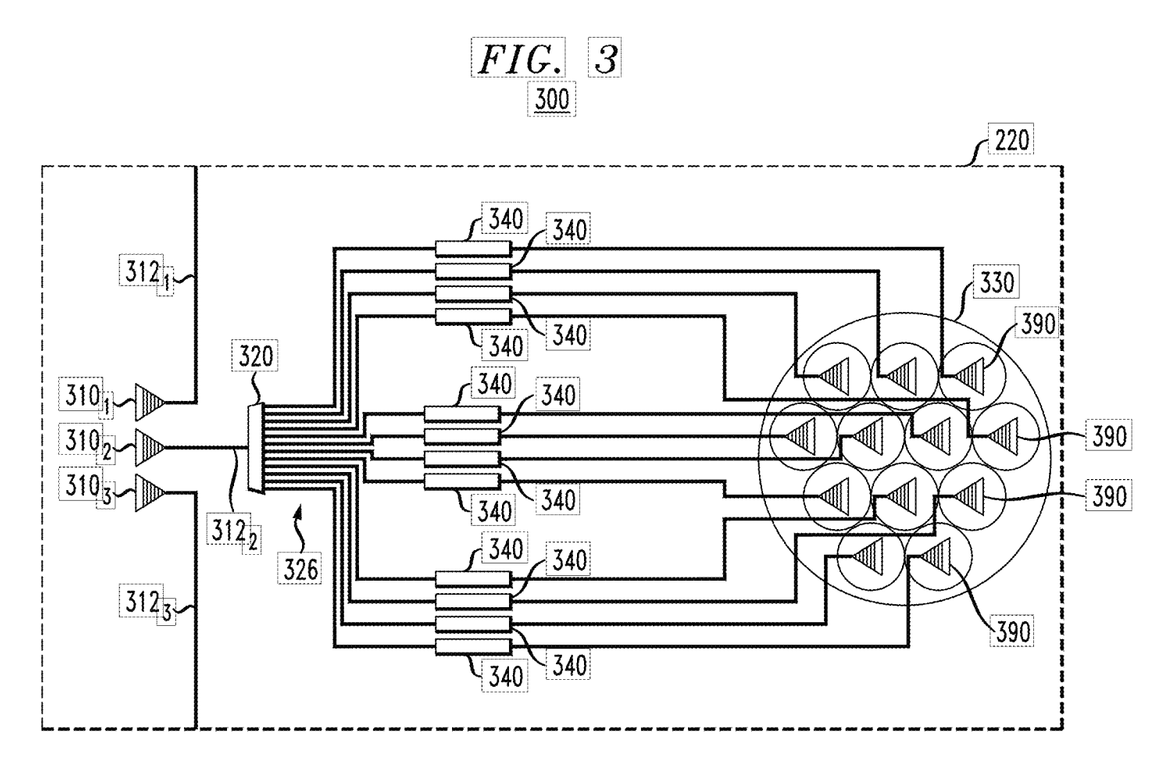
FIG. 3 shows a schematic top view of a photonic circuit that can be used in a chip stack of FIG. 2 according to an embodiment.

FIG. 3 shows a schematic top view of a photonic circuit 300 that can be a part of PIC 220 (FIG. 2) according to an embodiment. Circuit 300 can operate as an optical data transmitter and comprises input grating vertical optical couplers $310_1$-$310_3$, a plurality of optical modulators (e.g., EAM's) 340, and a plurality of output grating vertical optical couplers 390.

An optical fiber 122 (not explicitly shown in FIG. 3; see FIG. 1) can be configured to shine light onto one or more of the input grating vertical optical couplers $310_1$-$310_3$, which operate to couple received light into optical planar waveguides $312_1$-$312_3$, respectively. An optical splitter 320 connected to optical waveguide $312_2$ operates to split the light beam received therefrom and direct the resulting optical sub-beams into a plurality of optical planar waveguides 326. Each of the optical waveguides 326 is connected to feed the respective optical sub-beam into a respective one of optical modulators 340. The modulated light generated by the optical modulators 340 is then directed to the output grating vertical optical couplers 390, which operate to couple said modulated light into different respective cores of the multi-core fiber $130_2$ (not explicitly shown in FIG. 3; see FIG. 2), e.g., optically weakly coupled or uncoupled optical cores. The vertical footprint of the near-end of the multi-core fiber $130_2$ on the corresponding major plane of PIC 220 is indicated in FIG. 3 by a circle 330. The various smaller circles inside circle 330 are centered on and indicate the positions of the ends of the individual cores of the multi-core fiber $130_2$ (also see FIG. 2).

In some embodiments, some or all of grating vertical optical couplers 310 and 390 can be replaced by functionally similar vertical optical coupling structures, e.g., known to the persons skilled in the pertinent art. Example vertical optical coupling structures that can be used in some embodiments for this purpose are disclosed, e.g., in U.S. Pat. Nos. 8,494,315, 9,028,157, 8,604,577, 8,625,942, and 10,151,865, and in U.S. Patent Application Publication No. 2003/0235370, all of which are incorporated herein by reference in their entirety.

Figure 4:
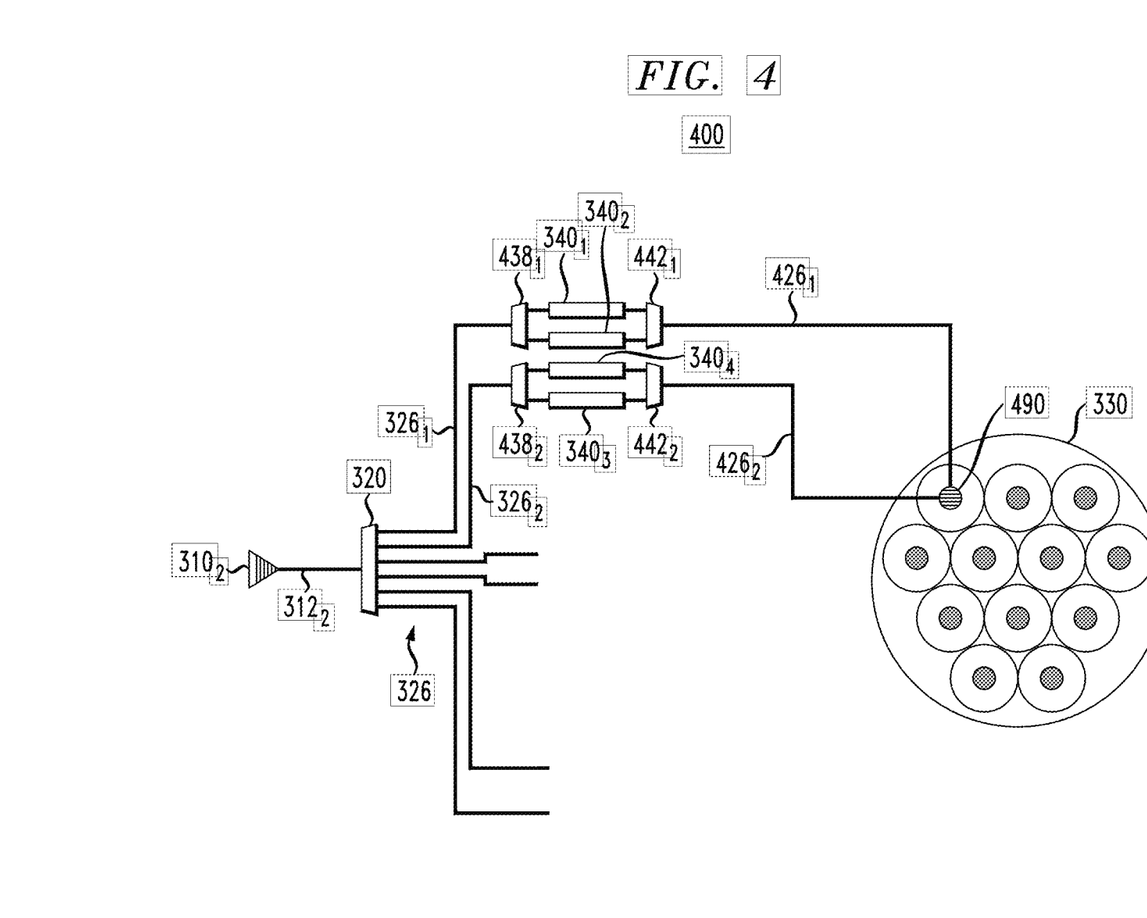
FIG. 4 shows a schematic top view of a photonic circuit that can be used in a chip stack of FIG. 2 according to an alternative embodiment.

FIG. 4 shows a schematic top view of a photonic circuit 400 that can be a part of PIC 220 (FIG. 2) according to an alternative embodiment. In circuit 400, some of optical modulators 340 are nested to enable the use of IQ optical modulation formats, such as QPSK, DQPSK, QAM, etc. Circuit 400 also supports the use of polarization multiplexing by employing one or more grating vertical optical couplers 490.

As an example, FIG. 4 shows four nested optical modulators 340, labeled $340_1$-$340_4$, connected between optical splitter 320 and the same grating vertical optical coupler 490. More specifically, optical modulators $340_1$ and $340_2$ are connected between optical planar waveguides $326_1$ and $426_1$ using an optical power splitter (e.g., a 3-dB splitter) $438_1$ and an optical power combiner $442_1$. Optical modulators $340_3$ and $340_4$ are similarly connected between optical waveguides $326_2$ and $426_2$ using an optical power splitter $438_2$ and an optical power combiner $442_2$.

In operation, optical modulator $340_1$ can be electrically driven to generate an in-phase (I) component of the modulated optical signal guided by optical waveguide $426_1$, and optical modulator $340_2$ can be electrically driven to generate a quadrature (Q) component of the modulated optical signal guided by that optical waveguide. Optical modulator $340_3$ can be electrically driven to generate an I-component of the modulated optical signal guided by optical waveguide $426_2$, and optical modulator $340_4$ can be electrically driven to generate a Q-component of the modulated optical signal guided by that optical waveguide.

In an example embodiment, the grating vertical optical coupler 490 is configured to couple the modulated optical signal received from optical waveguide $426_1$ into a first (e.g., X) polarization supported by the optical core to which the grating coupler is vertically optically end-coupled. The grating coupler 490 is further configured to couple the modulated optical signal received from optical waveguide $426_2$ into a second (e.g., Y) polarization supported by that same optical core, the second polarization being orthogonal to the first polarization. As such, the grating coupler 490 operates to perform polarization multiplexing. In at least some embodiments, the grating coupler 490 can be implemented using one of the polarization-sensitive grating couplers referred to and/or disclosed in U.S. Pat. Nos. 9,244,227 and 10,365,435, both of which are incorporated herein by reference in their entirety.

Figure 5:
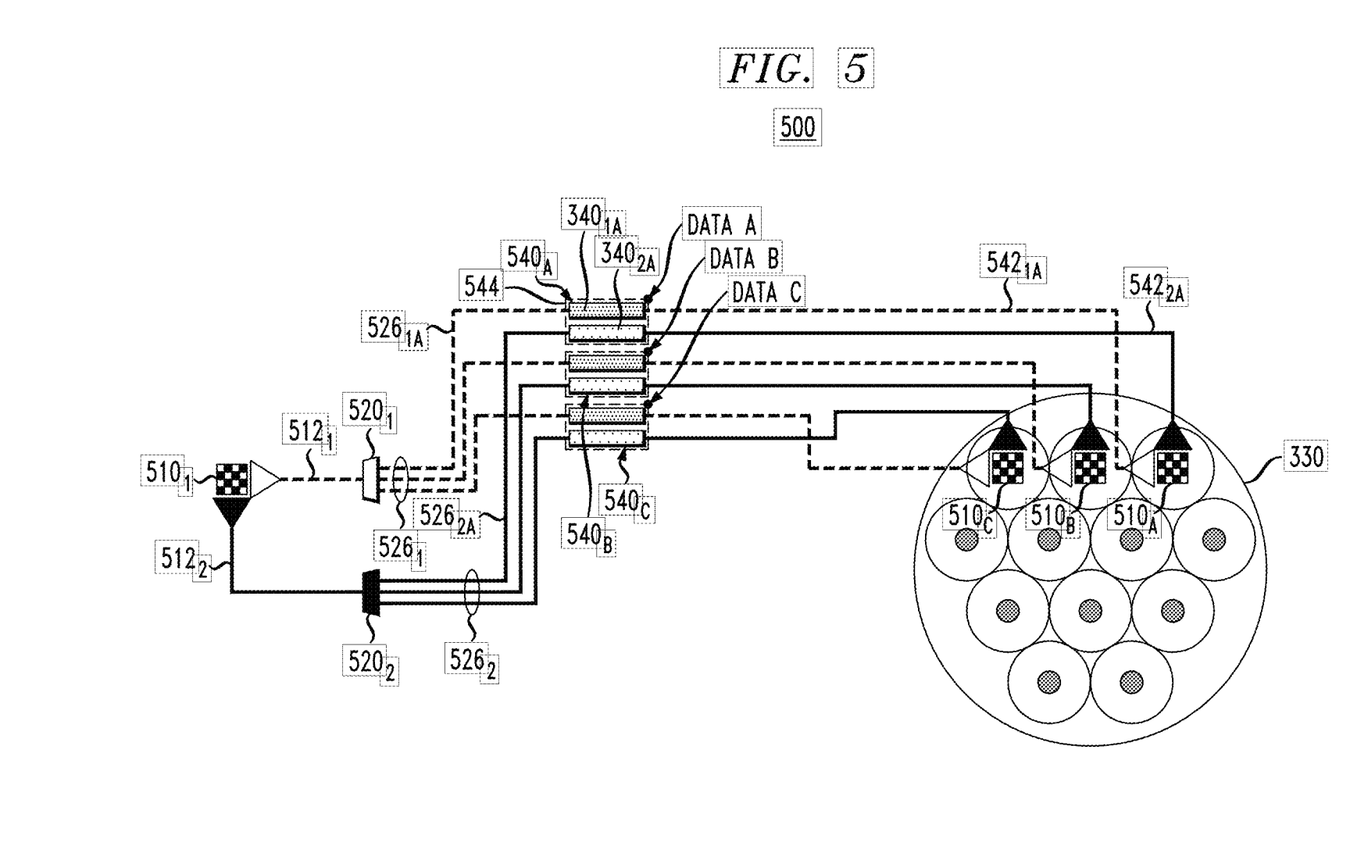
FIG. 5 shows a schematic top view of a photonic circuit that can be used in a chip stack of FIG. 2 according to yet another embodiment.

FIG. 5 shows a schematic top view of a photonic circuit 500 that can be a part of PIC 220 (FIG. 2) according to yet another embodiment. Circuit 500 comprises a plurality of grating vertical optical couplers (or functionally similar vertical optical coupling structures) 510. An individual grating vertical optical coupler 510 can operate as a polarization splitter (at the PIC input) or a polarization combiner (at the PIC output). An example grating vertical optical coupler that can be used to implement a grating coupler 510 is described, e.g., in C. R. Doerr et al., "Packaged Monolithic Silicon 112-Gb/s Coherent Receiver," in IEEE Photonics Technology Letters, vol. 23, no. 12, pp. 762-764, Jun. 15, 2011, which is incorporated herein by reference in its entirety.

A facing end of an optical fiber 122 (not explicitly shown in FIG. 5; see FIG. 1) can be configured to shine light onto grating vertical optical coupler $510_1$, which operates to: (i) split the received light into two orthogonal polarizations; (ii) couple the first polarization into optical planar waveguide $512_1$; and (iii) couple the second polarization into optical planar waveguide and $512_2$. An optical splitter $520_1$ connected to optical planar waveguide $512_1$ operates to split the light beam received therefrom and direct the resulting optical sub-beams into optical planar waveguides $526_1$. An optical splitter $520_2$ connected to optical planar waveguide $512_2$ similarly operates to split the light beam received therefrom and direct the resulting optical sub-beams into optical planar waveguides $526_2$. For illustration purposes and without any implied limitations, each of the optical planar waveguide sets $526_1$ and $526_2$ is shown in FIG. 5 as having three optical planar waveguides. In alternative embodiments, the optical planar waveguide sets $526_1$ and $526_2$ may have other numbers of optical planar waveguides.

In photonic circuit 500, optical modulators 340 are arranged in pairs 540, three of which (labeled $540_A$-$540_C$) are shown in FIG. 5 for illustration purposes. In each pair 540, the two corresponding modulators 340 are configured to: (i) receive light from different output ports of the grating coupler $510_1$; (ii) be driven by the same electrical signal or by respective electrical signals modulated by the same data sequence (such as two complementary signals coming out of two corresponding outputs of a CMOS inverter; and (iii) apply modulated light to different input ports of the corresponding output grating vertical optical coupler 510 (e.g., one of grating vertical optical couplers $510_A$-$510_C$). In some embodiments, each pair 540 of modulators 340 may be configured to share a common electrode to which the electrical drive signal can be applied.

For example, the modulator pair $540_A$ has optical modulators $340_{1A}$ and $340_{2A}$. Optical modulator $340_{1A}$ is connected to receive light from optical waveguide $526_{1A}$ and apply modulated light to optical waveguide $542_{1A}$. Optical modulator $340_{2A}$ is connected to receive light from optical waveguide $526_{2A}$ and apply modulated light to optical waveguide $542_{2A}$. Both of optical modulators $340_{1A}$ and $340_{2A}$ are driven using the same data signal, which is labeled in FIG. 5 as DataA. Data signal DataA can be applied e.g., to an electrode the footprint of which is indicated in FIG. 5 by the dashed box 544. Optical waveguides $542_{1A}$ and $542_{2A}$ apply the modulated light to two respective input ports of grating coupler $510_A$, which operates to couple the modulated light into two corresponding orthogonal polarizations of light in the respective core of the multi-core fiber $130_2$ (not explicitly shown in FIG. 5; see FIG. 2). The footprint of the multi-core fiber $130_2$ on the corresponding major plane of PIC 220 is indicated in FIG. 5 by circle 330.

Each of the modulator pairs $540_B$ and $540_C$ is optically coupled between the optical fibers 122 and $130_2$ similar to the modulator pair $540_A$.

Figure 6:
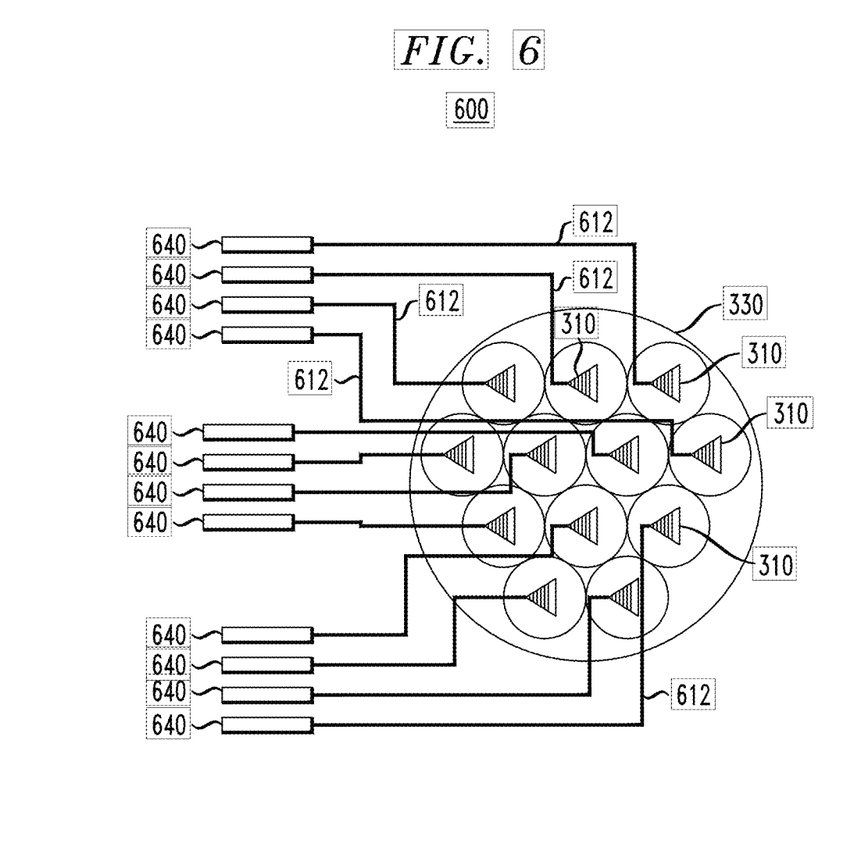
FIG. 6 shows a schematic top view of a photonic circuit that can be used in a chip stack of FIG. 2 according to yet another embodiment.

FIG. 6 shows a schematic top view of a photonic circuit 600 that can be a part of PIC 220 (FIG. 2) according to an embodiment. Circuit 600 can operate as an optical data receiver and comprises a plurality of input grating vertical optical couplers 310 and a corresponding plurality of photodetectors (e.g., photodiodes) 640.

In circuit 600, each of grating vertical optical couplers 310 is configured to receive light from the corresponding core of a multi-core optical fiber 130 whose end is facing thereto, the footprint of which multi-core fiber end is indicated in FIG. 6 by a circle 330. Each grating vertical optical coupler 310 operates to couple the received light into a corresponding optical planar waveguide 612, which directs the light to the corresponding photodetector 640. The electrical signals generated by the photodetectors 640 in response to the light delivered by optical planar waveguides 612 are transferred, e.g., by way of solder bumps or balls 140, to the corresponding electronic IC of the same stack 110 for further processing therein to recover the corresponding transmitted data streams (also see FIG. 1).

Figure 7:
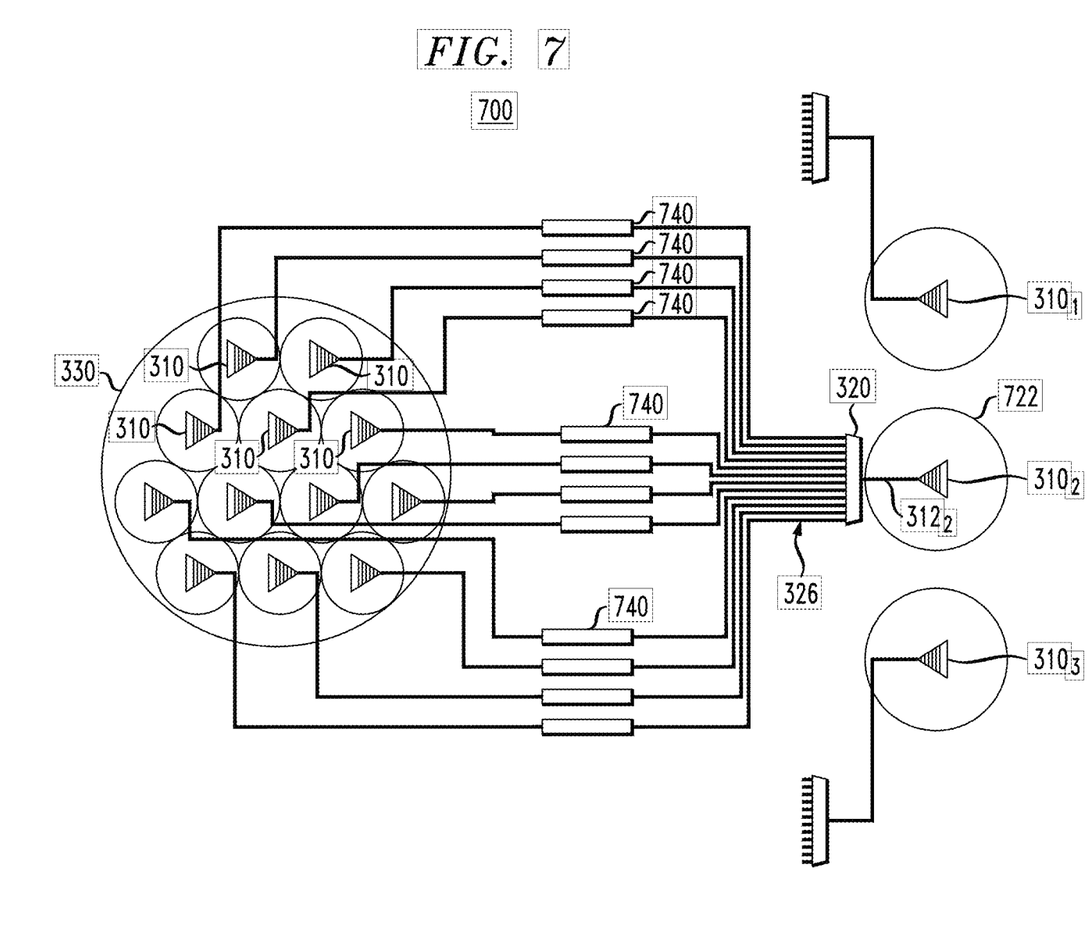
FIG. 7 shows a schematic top view of a photonic circuit that can be used in a chip stack of FIG. 2 according to yet another embodiment.

FIG. 7 shows a schematic top view of a photonic circuit 700 that can be a part of PIC 220 (FIG. 2) according to an embodiment. Circuit 700 can operate as an optical data receiver and comprises a plurality of input grating vertical optical couplers 310 and a corresponding plurality of photodetectors 740.

This particular receiver embodiment implements a coherent detection scheme, in which each of photodetectors 740 is connected to receive local-oscillator light through optical fiber 122 (see FIG. 1), input grating vertical optical coupler $310_2$, optical splitter 320, and a corresponding one of optical planar waveguides 326. In FIG. 7, a circle 722 indicates the footprint of the facing end of the optical fiber 122. Each of photodetectors 740 is also connected to receive data-modulated light through a corresponding input grating vertical optical coupler 310 located in the footprint 330 of the facing end of the optical fiber 130 (also see FIG. 1). In some embodiments, a photodetector 740 may comprise a 90-degree optical hybrid and two balanced photodetectors arranged and connected as known in the pertinent art.

In some embodiments, a PIC 220 may include an active polarization controller, e.g., similar to that disclosed in P. VELHA, V. SORIANELLO, M. V. PREITE, et al., "Wideband polarization controller for Si photonic integrated circuits," Optics Letters, 2016, Vol. 41, No. 24, pp. 5656-5659, which is incorporated herein by reference in its entirety.

According to an example embodiment disclosed above, e.g., in the summary section and/or in reference to any one or any combination of some or all of FIGS. 1-7, provided is an apparatus comprising: a photonic chip (e.g., 220, FIG. 2) having first and second opposing major surfaces and comprising a plurality of electro-optic elements (e.g., 340, FIGS. 3-5; 640, FIG. 6; 740, FIG. 7); and an electronic chip (e.g., 210, FIG. 2) having a major surface that has a plurality of electrical contacts (e.g., corresponding to 140, FIG. 2) thereon; wherein said major surface of the electronic chip is bonded to the first major surface of the photonic chip such that the plurality of electrical contacts of the electronic chip is in alignment with the plurality of electro-optic elements of the photonic chip; wherein the photonic chip further comprises a plurality of first vertical coupling structures (e.g., 390, FIG. 3; 310, FIG. 6) at the second major surface thereof, each of said first vertical coupling structures being connected by way of a respective first optical waveguide to a respective electro-optic element of the plurality of electro-optic elements; and wherein the first vertical coupling structures are arranged to receive light from or output light through the second major surface.

In some embodiments of the above apparatus, the first vertical optical coupling structures are arranged to receive the light from or output the light to different respective ends of optical cores of a multi-core optical fiber (e.g., 130, FIG. 1) in a direction that is substantially (e.g., to within ±30 degrees) orthogonal to the second major surface.

In some embodiments of any of the above apparatus, the photonic chip comprises a plurality of second vertical optical coupling structures (e.g., 310, FIG. 3) arranged to receive light from or output light to different respective cores of another multi-core optical fiber through the second major surface.

In some embodiments of any of the above apparatus, the photonic chip further comprises a second vertical optical coupling structure (e.g., $310_2$, FIG. 3) and an optical splitter (e.g., 320, FIG. 3) having an optical input connected to receive light from said second vertical optical coupling structure; and wherein the optical splitter comprises a plurality of optical outputs, each of said optical outputs being connected by way of a respective second optical planar waveguide (e.g., 326, FIG. 3) to a respective electro-optic element of the plurality of electro-optic elements.

In some embodiments of any of the above apparatus, the second vertical optical coupling structure is configured to receive light through the second major surface from an optical fiber (e.g., 122, FIG. 1).

In some embodiments of any of the above apparatus, the optical fiber is polarization maintaining.

In some embodiments of any of the above apparatus, the apparatus further comprises a light source (e.g., 120, FIG. 1) connected to apply light to the second vertical optical coupling structure.

In some embodiments of any of the above apparatus, each optical output of at least a subset of the optical outputs is connected by way of the respective second optical planar waveguide (e.g., $326_1$, FIG. 4) to a respective pair of the electro-optic elements (e.g., $340_1$, $340_2$, FIG. 4).

In some embodiments of any of the above apparatus, the plurality of electro-optic elements comprises one or more optical modulators (e.g., 340, FIG. 3).

In some embodiments of any of the above apparatus, the plurality of electro-optic elements comprises one or more photodetectors (e.g., 640, FIG. 6).

In some embodiments of any of the above apparatus, the apparatus further comprises one or more optical fibers (e.g., 122, 130, FIG. 1), each of the optical fibers having an end facing and near to the second major surface and optically coupled to one or more adjacent ones of the vertical coupling structures.

In some embodiments of any of the above apparatus, at least some of the one or more optical fibers are not polarization-maintaining optical fibers.

In some embodiments of any of the above apparatus, at least some of the electro-optic elements (e.g., $340_1$, $340_2$, FIG. 4) form one or more nested optical modulators coupled to transmit light with in-phase and quadrature modulation to corresponding one or more of the first vertical optical coupling structures.

In some embodiments of any of the above apparatus, the apparatus further comprises: a first chip stack (e.g., $110_1$, FIG. 1) that includes the photonic chip and the electronic chip; a second chip stack (e.g., $110_2$, FIG. 1) that includes a respective photonic chip and a respective electronic chip bonded together (e.g., as in FIG. 1); and one or more fibers (e.g., 130, FIGS. 1, 2) that optically connect the first and second chip stacks.

In some embodiments of any of the above apparatus, the apparatus further comprises a circuit carrier (e.g., 102, FIG. 1) on which the first and second chip stacks are mounted.

In some embodiments of any of the above apparatus, the first and second chip stacks are mounted on different respective circuit carriers (e.g., two different instances of 102 located at a relative distance of more than 10 cm).

In some embodiments of any of the above apparatus, the electrical contacts of the electronic chip are vertically in close proximity (e.g., at a distance that is on the order of 1 mm or less) to the corresponding electro-optic elements of the photonic chip.

In some embodiments of any of the above apparatus, the electro-optic elements are electro-absorption modulators (EAMs).

According to another example embodiment disclosed above, e.g., in the summary section and/or in reference to any one or any combination of some or all of FIGS. 1-7, provided is an apparatus comprising: a photonic chip (e.g., 220, FIG. 2) having first and second opposing major surfaces, said photonic chip comprising: a first vertical optical coupling structure (e.g., $510_1$, FIG. 5) at the first major surface, the first vertical optical coupling structure being configured to direct first and second polarizations of a received light beam to first and second optical outputs thereof (e.g., at $512_1$, $512_2$, FIG. 5), respectively, the received light beam being received through the first major surface; a second vertical optical coupling structure (e.g., $510_4$, FIG. 5) at the first major surface, the second vertical optical coupling structure being configured to couple light received through first and second optical inputs thereof (e.g., at $542_{1A}$, $542_{2A}$, FIG. 5) into first and second polarizations, respectively, of an output light beam, the output light beam being directed through the first major surface; a first optical modulator (e.g., $340_{1A}$, FIG. 5) optically connected between the first optical output of the first vertical optical coupling structure and the first optical input of the second vertical optical coupling structure and electrically connected to modulate light transmitted therethrough in response to an electrical data signal (e.g., DataA, FIG. 5); and a second optical modulator (e.g., $340_{2A}$, FIG. 5) connected between the second optical output of the first vertical optical coupling structure and the second optical input of the second vertical optical coupling structure and electrically connected to modulate light transmitted therethrough in response to said electrical data signal.

In some embodiments of the above apparatus, the photonic chip comprises an electrode (e.g., 544, FIG. 5) configured to receive said electrical data signal, the electrode having electrically connected first and second electrode portions; wherein the first optical modulator comprises the first electrode portion; and wherein the second optical modulator comprises the second electrode portion.

In some embodiments of any of the above apparatus, the electrode is an electrical transmission line and the first and second portions are electrically connected in parallel in said transmission line.

In some embodiments of any of the above apparatus, the apparatus further comprises an electronic chip (e.g., 210, FIG. 2) having a major surface facing and adjacent to the second major surface of the photonic chip, the electronic chip being connected to apply said electrical data signal to the photonic chip by way of electrical contacts (e.g., 140, FIG. 2) between the major surface of the electronic chip and the second major surface of the photonic chip.

In some embodiments of any of the above apparatus, each of the first and second optical modulators is an electro-absorption modulator (EAM).

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
   a photonic chip having first and second opposing major surfaces and comprising a plurality of electro-optic elements; and
   an electronic chip having a major surface that has a plurality of electrical contacts thereon;
   wherein said major surface of the electronic chip faces the first major surface of the photonic chip such that the electronic chip and the electro-optic elements are electrically connected;
   wherein the photonic chip further comprises a plurality of first vertical optical coupling structures at the second major surface thereof, each of said first vertical optical coupling structures being connected by way of at least a first optical planar waveguide to a respective electro-optic element of the plurality of electro-optic elements;
   wherein the first vertical optical coupling structures are capable of, at least one of receiving light externally incident on the second major surface and outputting light from the second major surface;
   wherein the photonic chip further comprises a second vertical optical coupling structure and an optical splitter having an optical input connected to receive light from said second vertical optical coupling structure;
   wherein the optical splitter comprises a plurality of optical outputs, each of said optical outputs being connected by way of a respective second optical planar waveguide to a respective electro-optic element of the plurality of electro-optic elements; and
   wherein each optical output of at least a subset of the optical outputs is connected by way of the respective second optical planar waveguide to a respective pair of the electro-optic elements.

2. The apparatus of claim 1, wherein the first vertical optical coupling structures are arranged to receive the light from or output the light to different respective cores of a multi-core optical fiber in response to an end of the multi-core fiber facing the second major surface and being aligned with the first vertical optical coupling structures.

3. The apparatus of claim 1, further comprising a light source connected to apply light to the second vertical optical coupling structure via an optical fiber having an end adjacent to and facing the second major surface.

4. The apparatus of claim 1, wherein the plurality of electro-optic elements comprises one or more optical modulators.

5. The apparatus of claim 1, wherein the plurality of electro-optic elements comprises one or more photodetectors.

6. The apparatus of claim 1, further comprising one or more optical fibers, each of the one or more optical fibers having an end adjacent to and facing the second major surface, each of the one or more optical fibers being optically end-coupled to one or more adjacent ones of the first vertical optical coupling structures.

7. The apparatus of claim 6, wherein at least some of the one or more optical fibers are not polarization-maintaining optical fibers.

8. The apparatus of claim 1, wherein at least some of the electro-optic elements form one or more nested optical modulators coupled to transmit light with in-phase and quadrature modulation to corresponding one or more of the first vertical optical coupling structures.

9. The apparatus of claim 1, further comprising:
   a first chip stack that includes the photonic chip and the electronic chip;
   a second chip stack that includes a respective photonic chip and a respective electronic chip bonded together; and
   one or more fibers that optically connect the first and second chip stacks.

10. The apparatus of claim 9, further comprising a circuit carrier on which the first and second chip stacks are mounted.

11. The apparatus of claim 9, wherein the first and second chip stacks are mounted on different respective circuit carriers.

12. The apparatus of claim 1, wherein the electrical contacts of the electronic chip are vertically facing corresponding electro-optic elements of the photonic chip.

13. The apparatus of claim 1, wherein at least some of the electro-optic elements are electro-absorption modulators.

14. An apparatus comprising:
   a photonic chip having first and second opposing major surfaces and comprising a plurality of electro-optic elements; and
   an electronic chip having a major surface that has a plurality of electrical contacts thereon;
   wherein said major surface of the electronic chip faces the first major surface of the photonic chip such that the electronic chip and the electro-optic elements are electrically connected;
   wherein the photonic chip further comprises a plurality of first vertical optical coupling structures at the second major surface thereof, each of said first vertical optical coupling structures being connected by way of at least a first optical planar waveguide to a respective electro-optic element of the plurality of electro-optic elements;
   wherein the first vertical optical coupling structures are capable of, at least one of receiving light externally incident on the second major surface and outputting light from the second major surface;
   wherein the photonic chip further comprises a second vertical optical coupling structure and an optical splitter having an optical input connected to receive light from said second vertical optical coupling structure;
   wherein the optical splitter comprises a plurality of optical outputs, each of said optical outputs being connected by way of a respective second optical planar waveguide to a respective electro-optic element of the plurality of electro-optic elements;

wherein the second vertical optical coupling structure is configured to receive light incident on the second major surface from a facing end of an optical fiber; and wherein the optical fiber is polarization maintaining.

* * * * *